Feb. 22, 1966  H. J. MATSON  3,236,771

ANTI-CHATTER GEAR LUBRICATION

Filed Nov. 2, 1964

INVENTOR.
HOWARD J. MATSON
BY McLean & Dibble
ATTORNEY

United States Patent Office 3,236,771
Patented Feb. 22, 1966

3,236,771
ANTI-CHATTER GEAR LUBRICATION
Howard J. Matson, Harvey, Ill., assignor to Sinclair Research, Inc., New York, N.Y., a corporation of Delaware
Filed Nov. 2, 1964, Ser. No. 408,425
25 Claims. (Cl. 252—32.7)

This application is a continuation-in-part of my now abandoned applications Serial No. 768,385, filed October 20, 1958 and Serial No. 824,941, filed July 6, 1959, the prior of these applications being a continuation-in-part of my copending application Serial No. 762,679, filed September 23, 1958.

This invention relates to an improved extreme-pressure lubricant and to the prevention of "chatter" in limited slip differential (LSD) gears. The improved hypoid gear lubricants of this invention provide distress-free operation of these locking or limited-slip differentials.

The conventional differential, as used in automotive vehicles today, divides the load equally between both driving wheels in ordinary driving and, when turning, drives the wheel which is easier to turn. This is a definite disadvantage under adverse weather and road conditions where the traction of one wheel is limited. Recently, some passenger cars have adopted the controlled slip or limited slip differential. This differential is a device which permits the major driving force to be transmitted to the wheel with the greater traction, as opposed to the conventional differential which drives the wheel easier to turn. With the higher horsepower available from modern engines, this feature is important in preventing wheel spin and sudden shock loads under non-uniform surface conditions such as rough roads, ice patches, wet and dry pavement, etc. A typical example of this differential is the Spicer Thornton Powr-Lok, manufactured by the Dana Corporation, Toledo, Ohio, and sold under a variety of trade names.

Figure 1:
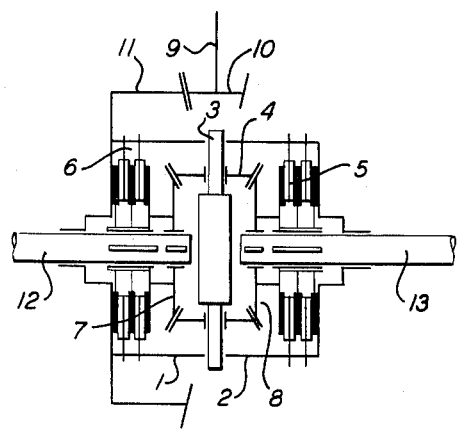
Figure 2:
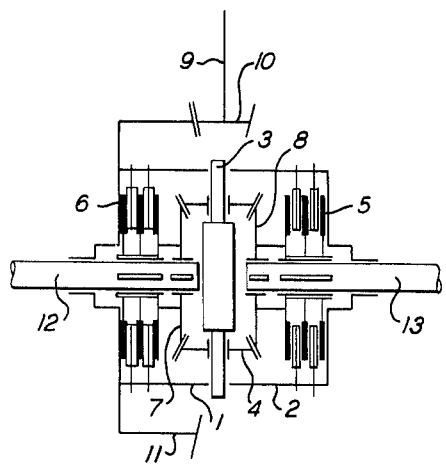

This type of limited-slip differential is described in Mechanix Illustrated, Vol. 54, Number 6, page 149 (June 1958). The internal members of this differential are shown in the accompanying drawing in which FIGURE 1 is a schematic elevation of a cross-section of the differential under driving conditions where both rear wheels of the car have equal traction. FIGURE 2 is a representation of the differential under driving conditions where the wheels have unequal traction.

The sides 1 and 2 of the differential case enclose the differential pinion 3 which is provided with gears 4, and also enclose sets 5 and 6 of clutch plates and rings to the right and left of side gears 7 and 8. The gears 4, along with the side gears 7 and 8, make up a planetary gear set. Another pinion (not shown) may be provided, crossing the pinion 3, usually transversely at a loose mortised joint.

Torque is transmitted from the engine through the drive shaft 9 and gear 10 to the gear 11 which is fastened to or made integral with one side 1, of the differential case. Power is apparently transmitted from the differential case 1, 2, to the axles, 12 and 13 by two routes: (a) through the pinions 3, the planetary gears set (which does not act planetarily in the position of FIGURE 1), and also (b) through the clutch plate sets 5 and 6 wherein the plates are in frictional contact with each other. Play, allowing horizontal movement of elements 3, 5, 6, 7 and 8, in the range of 0.01 inch to 0.035 inch, is allowed to exist in the differential when it is adjusted.

Under driving conditions which cause one wheel to move more freely than the other the elements of the differential assume more or less the position shown in FIGURE 2. If 13 is considered to be the right axle, then, when the car makes a left turn, or when the right rear wheel is on a slippery surface, the axle 13 is freer to move than the axle 12. The pinion 3 shifts somewhat to the left, and more friction is created in the clutch pack 6, while the clutch patck 5 opens. As a result, more torque is transmitted to axle 12. The advantages of the limited slip differential derive from this ability to transmit the greater driving force to the wheel that has the better traction. This is, of course, opposite to the action of a conventional differential where the power follows the path of least resistance and drives the wheel that is easiest to turn. As is readily apparent, in the case of an auto that has one rear wheel on a low friction surface such as ice, and the other rear wheel on a high friction surface such as dry concrete, a conventional differential can direct to the wheel on the high friction surface only the torque absorbed by the spinning wheel plus the friction in the differential gear set. Since this friction is minimal, no usable power is realized. With the limited slip differential, however, increased friction is put into the differential so that the driving force delivered to the wheel having more traction is about four times greater than that of the spinning wheel. This usually is sufficient to prevent stalling or wild wheel spin.

It is well known that the high pressures occurring in certain gears and bearings may cause a lubricant film to rupture, so that opposing metal surfaces contact each other. This metal contact results in scuffing, seizure, excessive wear, loss of efficiency, and ultimately in the failure of the mechanism. In addition, these high pressures on the oil film effect a rise in internal heat which may be increased by any friction resulting from the metal contacts through breaks in the oil film. Consequently, mechanisms in which high pressures are likely to occur demand lubricants that have both high lubricity and high film strength or extreme pressure properties.

It is recognized in the art that these two requirements are frequently antipathetic to each other. That is, an additive which has high film strength does not necessarily have good lubricity or "oiliness" and may, in fact, increase friction and heating in the oil film. Conversely, an additive having good lubricity or "oiliness" does not necessarily have good extreme pressure properties, and may in fact mask or interfere with the action of a separate extreme pressure compound.

Hypoid gears require a lubricant having both lubricity and extreme pressure properties. In this case, however, the extreme pressure properties are more important than the oiliness or friction properties, so that some increase in friction may be tolerated in order to realize better extreme pressure lubrication. This is particularly true with modern automotive equipment, where increased speeds and loads have increased extreme pressure requirements to the point where previously known gear lubricants are no longer suitable. More powerfully active extreme-pressure compositions have been developed to meet the high speed requirements of passenger cars and commercial vehicles, as well as the high torque requirements of heavily loaded commercial vehicles, and this approach to the lubrication of differential assemblies is given in Kent's Mechanical Engineers Handbook, Power Volume, 12th Edition, 1950, pages 14–84, in the paragraph:

"Rear axle lubricants are specified by SAE viscosity numbers 80, 90, 140 and 250. SAE 80 is for extremely low temperatures and SAE 250 for extremely high temperatures. In gearing with high tooth loading or rubbing, special compounded oils are necessary. Small percentages of materials, such as sulfur or chlorine compounds, give the oil larger load-carrying capacities than are possible with mineral oil alone. Such oils, frequently called extreme pressure lubricants, are commonly specified for truck, bus, and passenger car service."

Certain phosphorus compounds have also been found to impart extreme pressure qualities to lubricants.

However, the interplay of pressures and forces during turns under load results in a special lubrication problem, peculiar to the limited-slip differential. The problem is manifest as a "chatter" that can range in intensity from a single "clunk" to a prolonged shudder of the entire car. This condition may be caused by a "stick-slip" action between the contacting friction surfaces of the clutch plates, although the action of the side gear on the clutch pack, or play between the transverse pinions or at the axle shaft splines may be contributing factors.

In one aspect, this invention is drawn to a method for the prevention of chatter in a limited slip differential gear. The method comprises lubricating the differential with a lubricant composition which gives proper lubrication to the hypoid gearing and contains a special additive which prevents the lubricant from causing chatter. It is a further object of this invention to impart chatter-free LSD operation in an otherwise dstress-prone extreme pressure gear lubricant, which has a moderate level of extreme pressure activity designed to prevent scoring and welding of gears under average or normal conditions.

Selecting the proper lubricant for the limited slip differential (LSD) is complicated by the presence of two different mechanisms having different lubricant requirements in the same housing. The hypoid gearing demands a powerful extreme pressure lubricant suitable for both high torque and high speed driving conditions. Friction surfaces of clutch plates in the differential require a lubricant having a low coefficient of friction (high in oiliness or lubricity). These requirements are not only different, they are generally incompatible. Although it is known that most non-additive mineral gear oils will perform reasonably well in this unit as to chatter, such oils have insufficient load carrying properties. Therefore, an all-purpose gear oil must be used and will contain active extreme pressure elements such as sulfur, chlorine, lead, phosphorus and zinc, either alone or in the various combinations required to give a balanced hypoid gear lubricant, and yet not cause chatter distress in the LSD.

Up to this time, it has not been possible to provide a gear lubricant specifically designed to give good LSD performance in combination with a high level of EP gear lubrication under both high speed and high torque conditions. That is, prior to this time, no additive material has been known which can be used to give chatter-free LSD operation regardless of the type, nature or activity of other additive compounds present in the oil.

It has now been found that when lubricating compositions are used in a limited-slip differential which contain small, effective amounts of certain oil-soluble oxygen compounds in addition to conventional extreme pressure agents such as chlorine, sulfur, phosphorus, lead or zinc compounds, the differential can be satisfactorily lubricated without the occurrence of chattering.

As mentioned, to make a multi-purpose lubricant for differentials, a combination of additives is conventionally used to impart the needed extreme-pressure properties. The combination usually includes sulfurized saturated or olefin hydrocarbons. These materials have been found necessary if the lubricant is to maintain its extreme pressure usefulness under high speed conditions. They are usually prepared by the reaction of hydrocarbons, preferably branched chain, of 8–32 carbon atoms with sulfur and comprise about 25 to 75% sulfur by weight. Although sulfurized hydrocarbons having as little as 10% sulfur by weight are sometimes used, the more highly sulfurized materials, in an amount from about 0.5 to 5% by weight of the lubricant composition, are most often used to give a fully satisfactory multi-purpose material.

Along with a sulfurized hydrocarbon, other materials can be used to help this material impart the desired extreme pressure properties to the lubricant. Among these materials are chlorinated hydrocarbons, and phosphosulfurized mineral oil. These latter two materials are usually used in combination with zinc dithiophosphate or sulfurized fatty esters.

A typical chlorinated hydrocarbon is a product usually containing about 25 to 75% chlorine by weight and made by the reaction of gaseous chlorine with a high-boiling saturated or unsaturated aliphatic or alicyclic hydrocarbon of say 8 to 32 carbon atoms. Similar hydrocarbons can be phosphosulfurized. A preferred material of this type is a phosphorus and sulfur treated mineral oil made by treating a 300 vis. bight stock with about 15% $P_2S_5$ at 440° F. for about 14 hours, then steaming at 300–325° F. for about 8 hours, followed by dehydration. The total phosphorus and sulfur content of such a material is low—from, say, about 1 to 10% or more, with at least about 0.5% each of S and P being present. A preferred type of sulfurized fatty ester or fatty oil containing about 5 to 15% S is made by treating sperm oil with about 12% sulfur at 340 to 350° F. for 6 hours, with a one-hour air blow at 250° F. A preferred dialkyl dithiophosphate is, for example, zinc dimethylamyl dithiophosphate which is made by reacting the acid ester from the reaction of methyl amyl alcohol with $P_2S_5$, with zinc metal or zinc oxide to form the neutral reaction product. Other useful zinc dithiophosphates contain generally about 4 to 18 carbon atoms, preferably 6 to 12, in each ester group. Of course, all of the components of these additives are selected to give materials soluble in the base mineral oil.

When a chlorinated hydrocarbon-zinc dithiophosphate combination is used with the sulfurized hydrocarbon to impart further extreme pressure properties, these ingredients are effective when they total about 3–9% of the weight of the lubricant, while each is present in an amount greater than about 1%. When a phosphosulfurized mineral oil is used in combination with a sulfurized ester, in a multi-purpose gear oil lubricant, the finished composition usually contains a total of about 5–15% of these additives comprised of about 1–5% phosphosulfurized mineral oil and about 4–14% sulfurized fatty ester. Preferred ranges are about 1.5 to 3.5% for the sulfurized hydrocarbon, about 2–4% for the chlorinated hydrocarbon, about 2–4% for the dithiophosphate, about 1–4% for the phosphosulfurized oil and about 7–12% for the sulfurized fatty ester.

The mineral oil base stock conventionally used is of lubricating viscosity and can be, for instance, a solvent extracted or solvent refined oil obtained in accordance with conventional methods of solvent refining lubricating oils. Generally, lubricating oils have viscosities from about 35 to 250 SUS at 210° F. The base oil may be derived from paraffinic, naphthenic, asphaltic, or mixed base crudes, and if desired, a blend of solvent treated Mid-Continent neutrals and Mid-Continent bright stocks may be used.

The best multi-purpose gear oils require a combination of extreme pressure additives amounting to about 5 to 20% of the total weight of the lubricant, usually about 8–13%. Two such oils in widespread use today are:

Composition A:                                     Parts
  Solvent refined mineral oil _____ 81
  Sulfurized sperm oil _____  9
  Sulfurized olefin hydrocarbon _____  2
  Phosphosulfurized mineral oil _____  2
Composition B:
  Solvent refined mineral oil _____ 91
  Sulfurized olefin hydrocarbon _____ 2.5
  Chlorinated paraffin _____ 3.5
  Zinc dialkyl dithiophosphate _____ 3.0

The sulfurized hydrocarbon is a composition in which the hydrocarbon has a structure similar to di- or polyisobutylene and contains about 46% S. The chlorinated hydrocarbon is one containing about 50% Cl and having a branched chain paraffinic structure. The phosphosulfurized oil was prepared from a solvent refined Mid-Continent bright stock having a viscosity (SUS) of 150 at 210° F. and contained less than 2.4% S and 3.0–3.4% P, see Patent No. 2,715,612.

Composition A meets the former military 2105 specification and has been in use for 8–10 years. It performs well in perhaps 90% of today's applications, but it starts breaking down in some high-load, high-speed sustained operations. Composition B, on the other hand, overcomes these shortcomings but it may cause rusting and long-term wear. For this reason a small quantity of lauric acid is sometimes included in Composition B to inhibit rusting, apparently by stabilizing the lubricant.

These compositions are among those which have been found to cause chattering when used to lubricate a limited-slip differential, even though one material, sulfurized sperm oil, is reported in U.S. Patent 2,851,422 to inhibit chattering when used in hydraulic fluids for automatic fluid transmissions. By this invention, however, it has been found possible to minimize or eliminate the chatter associated with these compositions while maintaining their extreme pressure properties under the most severe hypoid gear operation such as shock or bump loading and sustained high speed operation under high load conditions.

In general, the composition of this invention comprises extreme pressure mineral oil lubricant compositions containing oil-soluble organic sulfur compounds and perhaps other auxiliary extreme pressure agents, together with a minor amount, sufficient to provide chatter-free limited, slip differential lubrication, of an oil-soluble ether alcohol. These compounds are oxyalkylated alcohols and oxyalkylated alcohol-containing materials. They are commercially available under the trade-names Tween, Brij, Myrj, Atlox, etc. These materials are the reaction products of ethylene oxide with a fatty alcohol or a polyhydric alcohol fatty acid ester where the product contains no more than five moles of ethylene oxide per mole of the fatty alkyl radical. In these materials the fatty alkyl radical should contain enough carbon atoms to provide the oxyalkylated compound with oil solubility, generally 6 to 32 carbon atoms.

The ether alcohols or alcohol derivatives are used in the proportions of 0.1 to 2%, preferably 0.15 to 1.5% by weight of the lubricant. They may be prepared by reacting about 5–75 weight percent, preferably about 10–50 weight percent of a $C_2$–$C_4$ alkylene oxide with about 25 to 95 weight percent, preferably about 50–90 weight percent of the fatty alcohol or fatty ester. Mixtures of alkylene oxides and mixtures of fatty alcohols or fatty esters of the same type may be employed. The oxyalkylation reaction is conducted at a temperature of about 250° to 400° F., preferably about 300° to 350° F. in the presence of an oxyalkylation catalyst, such as sodium methylate. The alcohol or derivative may be dissolved, prior to the reaction, in an inert aromatic hydrocarbon solvent such as xylene. A preferred oxyalkylated fatty alcohol is Brij 30, an oily liquid lemon-colored polyoxyethylene-treated lauryl alcohol having a specific gravity of 0.92–0.98. Preferred oxyalkylated fatty esters are polyoxyethylene sorbitol laurate and Tween 65, a waxy liquid polyoxyalkylene derivative of sorbitan tristearate having a specific gravity of 1.03 to 1.08 Other polyoxyethylene-treated sorbitol-fatty acid compounds are sold under the trade-names Atlas 1045G and Atlas G–186.

Compositions made according to this invention may also contain, besides extreme pressure and anti-chatter ingredients, minor amounts of pour depressors, foam inhibitors such as silicone polymers, viscosity index improvers such as oil-soluble acrylate polymers, etc. It has been found that lauric acid is an effective rust preventive in the compositions of the invention. The compositions of the invention may contain for instance 0–0.01% anti-foam agent, 0–0.5% VI improver, 0–0.25% rust preventive, 0.1–2% anti-chatter agent, 0.5 to 5% sulfurized hydrocarbon, other extreme pressure agents in a range of 3–9% for a combination of chlorinated paraffin and zinc dithiophosphate or a range of 5–15% for a combination of phosphosulfurized mineral oil and a sulfurized ester, and the balance a mineral oil of lubricating grade sufficient to give a SAE 90 grade gear oil.

EXAMPLES

Specific compositions embodying this invention were made and used for lubricating limited slip differentials. These gear oils were tested for their effectiveness in mitigating chatter in a limited-slip differential. Each of the samples reported in Table I used either composition A or composition B described above as the base gear oil. Each of the samples reported below contained about 0.1% petrolatum, 0.1 to 0.15% Acrylate V.I. improver, a 40% solution in mineral oil of a methacrylate ester polymer wherein the methacrylic acid is esterified with a mixture of cetyl, lauryl and octyl groups, the polymer having a molecular weight of about 10,000 to 15,000, and for anti-foaming properties, about 0.005% of a liquid methyl silicone polymer having a viscosity at 25° C. of about 100 cs. Samples G to M also contained 0.5% lauric acid.

These and other compositions were evaluated by testing under actual driving conditions using a Chevrolet and/or a DeSoto equipped with a limited-slip differential and using the following procedure:

After flushing the differential with a test sample, draining it thoroughly and recharging with another portion of the test sample, the car was driven through a series of figure 8's and circles in both directions at intermittent throttle. This procedure insured the lubricant a greater chance of working in between the friction clutch plates.

From a stop position, each car was accelerated in a tight left circle through a series of from 3 to 5 slow, moderate and fast accelerations; the chatter intensity, if any, was rated for each acceleration speed.

In a tight left circle, the car was started in motion while applying moderate braking action and accelerating to 5–8 m.p.h. A minimum of 3 complete circles was made at a steady pace with the brake on; the chatter intensity, if any, was rated for each circle. Then the procedure was repeated for right turns.

Table I reports the results of tests using these samples and samples of some additives ineffective in practical quantities in a Chevrolet equipped with a limited-slip differential.

*Table I*

| Sample | Base Gear Oil | Oxyethylene-treated Component percent | Chatter Rating |
|--------|---------------|----------------------------------------|----------------|
| C      | A             | None                                   | Very heavy.    |
| D      | A             | Brij 30 (0.5%)                         | Medium.        |
| E      | A             | Tween 65 (0.5%)                        | Do.            |
| F      | B             | None                                   | Very heavy.    |
| G      | B             | ----do----                             | Heavy.         |
| H      | B             | Atlas 1045G (0.1%)                     | Light.         |
| J      | B             | Tween 65 (0.5%)                        | Do.            |
| K      | B             | Tween 65 (1.0%)                        | None.          |
| L      | B             | Atlas G–1086 (0.5%)                    | Light.         |
| M      | B             | Brij 30 (0.5%)                         | Do.            |
| N      | B             | Polyoxyethylene sorbitol laurate (0.1%). | None.        |
| 9      | A             | Stearic acid (1%)                      | Very heavy.    |
| 10     | A             | Caprylic acid (3%)                     | Medium.        |
| 11     | A             | Mixed fatty acid (10%)                 | Light.         |
| 12     | A             | Sperm oil (10%)                        | Very heavy.    |
| 13     | A             | Sulfurized lard oil—9% S (15%)         | Heavy.         |

It is significant to note the relatively minor percentages of the oxyalkylated materials that are effective, indicating a true additive effect. This contrasts with the massive doses, say 10%, of a recognized oiliness material such as mixed fatty acids found to be required to effect improved but less-than-perfect performance.

It is claimed:

1. A method for reducing chatter in a limited slip differential gear assembly which comprises lubricating the assembly with a mineral lubricating oil containing about 5–20% by weight of extreme pressure agent and about 0.1 to 2% of oil-soluble anti-chatter agent selected from the group consisting of oxyalkylated fatty alcohols and oxyalkylated polyhydric alcohol fatty acid esters, said oxyalkylated agent being prepared by the reaction of about 5–75 weight percent of a $C_2$–$C_4$ alkylene oxide with about 25 to 95 weight percent of the selected fatty material.

2. The method of claim 1 in which the extreme pressure agent is selected from the group consisting of chlorine, sulfur, phosphorus, lead and zinc compounds.

3. The method of claim 2 in which the anti-chatter agent has 6 to 32 carbon atoms.

4. The method of claim 3 in which the anti-chatter agent has up to five moles of a $C_2$ to $C_4$ alkylene oxide per mole of anti-chatter agent.

5. A method for reducing chatter in a limited slip differential gear assembly which comprises lubricating the assembly with a lubricant consisting essentially of a base mineral oil of lubricating viscosity, about 0.5 to 5 percent sulfurized hydrocarbon, a small amount, effective to give extreme pressure properties, of an additive combination selected from the group consisting of the combination of chlorinated hydrocarbons and zinc dithiophosphate and the combination of phosphosulfurized hydrocarbons and sulfurized fatty esters, and about 0.1 to 2 percent of an oil-soluble anti-chatter agent selected from the group consisting of oxyalkylated fatty alcohols and oxyalkylated polyhydric alcohol fatty acid esters, said oxyalkylated agent being prepared by the reaction of about 5–75 weight percent of a $C_2$–$C_4$ alkylene oxide with about 25 to 95 weight percent of the selected fatty material.

6. The method of claim 5 in which the lubricant contains an extreme pressure combination selected from the group consisting of about 3–9 percent of chlorinated hydrocarbons and zinc dithiophosphate and about 5–15 percent of phosphosulfurized mineral oil and a sulfurized fatty oil.

7. The method of claim 5 in which the lubricant contains about 1.5 to 3.5 percent sulfurized olefin hydrocarbon, about 2–4 percent chlorinated hydrocarbon, about 2.4 percent zinc dialkyl dithiophosphate, and about 0.15 to 1.5 percent of the anti-chatter agent.

8. The method of claim 5 where the mineral lubricating oil contains 0.5 to 3.5 percent sulfurized olefin hydrocarbons, about 1–4 percent phosphosulfurized mineral oil, about 7–12 percent sulfurized sperm oil, and 0.15 to 1.5 percent of the anti-chatter agent.

9. The method of claim 5 where the anti-chatter agent is polyoxyethylene sorbitol laurate.

10. A gear oil consisting essentially of about 0.5 to 5% base-oil-soluble sulfurized hydrocarbon of 8 to 32 carbon atoms containing about 10 to 75% sulfur by weight and a small amount, effective to give extreme pressure properties, of a base-oil-soluble additive selected from the group consisting of chlorinated hydrocarbon of 8 to 32 carbon atoms containing about 25 to 75% chlorine by weight, zinc dialkyl dithiophosphate, phosphosulfurized hydrocarbon of about 8 to 32 carbon atoms containing about 1–10% total sulfur and phosphorus and at least about 0.5% each of sulfur and phosphorus, sulfurized fatty ester containing about 5 to 15% sulfur, and mixtures of the same, about 0.1 to 2% of a base oil-soluble ether alcohol product made by oxylalkylating about 25 to 95 weight percent of a fatty alkyl radical containing material having 6 to 32 carbon atoms in the fatty alkyl radical with about 5 to 75 weight percent of a $C_2$–$C_4$ alkylene oxide, said fatty alkyl radical-containing material being selected from the group consisting of fatty alcohols and fatty acid esters of polyhydric alcohols, and a base mineral oil of lubricating grade.

11. A gear oil consisting essentially of about 0.5 to 5% base-oil-soluble sulfurized hydrocarbon of 8 to 32 carbon atoms containing about 25 to 75% sulfur by weight, a base-oil-soluble extreme pressure additive combination selected from the group consisting of about 3 to 9% of a base-oil-soluble combination providing at least about 1% each of chlorinated paraffinic hydrocarbon of 8 to 32 carbon atoms containing about 25 to 75% chlorine by weight, and zinc dialkyl dithiophosphate having about 4 to 18 carbon atoms in each ester group, and about 5 to 15% of a base-oil-soluble combination providing about 1 to 5% of a phosphosulfurized hydrocarbon of about 8 to 32 carbon atoms containing about 1 to 10% total sulfur and phosphorus and at least about 0.5% each of sulfur and phosphorus and about 4 to 14% of a sulfurized fatty ester containing about 5 to 15% sulfur, about 0.1 to 2% of a base-oil-soluble ether alcohol product made by oxyalkylating about 50 to 90 weight percent of a fatty alkyl radical containing material having 6 to 32 carbon atoms in the fatty alkyl radical with about 10 to 50 weight percent of ethylene oxide, said fatty alkyl radical-containing material being selected from the group consisting of fatty alcohols and fatty acid esters of polyhydric alcohols and a base mineral oil of lubricating grade.

12. The composition of claim 11 in which the reaction product is polyoxyethylene sorbitol laurate.

13. A gear oil consisting essentially of about 1.5 to 3.5% base oil-soluble sulfurized olefin hydrocarbon containing about 25 to 75% sulfur by weight, about 2 to 4% base oil-soluble chlorinated hydrocarbon containing about 25 to 75% chlorine by weight, about 2 to 4% base oil-soluble zinc dialkyl dithiophosphate having about 4 to 18 carbon atoms in each ester group, about 0.15 to 1.5% of a base-oil-soluble ether alcohol product made by oxyalkylating about 50 to 90 weight percent of a fatty alkyl radical containing material having 6 to 32 carbon atoms in the fatty alkyl radical with about 10 to 50 weight percent of ethylene oxide, said fatty alkyl radical containing material being selected from the group consisting of fatty alcohols and fatty acid esters of polyhydric alcohols and a base mineral oil of lubricating grade.

14. The composition of claim 13 where the selected fatty alkyl radical containing material is sorbitan tristearate.

15. A gear oil consisting essentially of about 0.5 to 3.5% base oil-soluble sulfurized olefin hydrocarbon containing about 25 to 75% sulfur by weight, about 1 to 4% phosphosulfurized mineral oil containing about 1 to 10% total sulfur and phosphorus, about 7 to 12% sulfurized sperm oil containing about 5 to 15% sulfur, about 0.15 to 1.5% of a base-oil-soluble ether alcohol product made by oxyalkylating about 50 to 90 weight percent of a fatty acid ester of a polyhydric alcohol of 6 to 32 carbon atoms in the fatty alkyl group with about 10 to 50 weight percent of ethylene oxide, and a base mineral oil of lubricating grade.

16. The composition of claim 15 where the ester is sorbitan tristearate.

17. A gear oil consisting essentially of
I. about 0.5 to 5% base-oil soluble sulfurized hydrocarbon of 8–32 carbon atoms containing about 25 to 75% sulfur
II. a small amount, effective to give extreme pressure properties, of a base-oil-soluble additive selected from the group consisting of
A. chlorinated hydrocarbon of 8 to 32 carbon atoms containing about 25% to 75% chlorine by weight,
B. zinc dialkyl dithiophosphate having about 4 to 18 carbon atoms in the alkyl group,
C. phosphosulfurized hydrocarbon of 8 to 32 carbon atoms containing about 1 to 10% total sulfur and phosphorus,
D. sulfurized fatty ester containing about 5 to 15% sulfur and E. mixtures of the same
III. about 0.1 to 2% of an oil-soluble ether alcohol consisting essentially of an oxyalkylated fatty alkyl radical-containing material
  (1) selected from the group consisting of
    A. fatty alcohols and
    B. fatty acid esters of polyhydric alcohols and
  (2) having
    A. 6–32 carbon atoms in the fatty alkyl radical and
    B. up to five $C_2$–$C_4$ alkylene oxide groups per fatty alkyl radical, and
IV. a base mineral oil of lubricating grade.

18. The composition of claim 17 in which the ether alcohol is made by oxyalkylating about 25 to 95 weight percent of the fatty alkyl radical containing material having 6 to 32 carbon atoms in the fatty alkyl radical with about 5 to 75 weight percent of a $C_2$–$C_4$ alkylene oxide.

19. The composition of claim 17 in which the ether alcohol is made by oxyalkylating about 50 to 90 weight percent of the fatty alkyl radical containing material having 6 to 32 carbon atoms in the fatty alkyl radical with about 10 to 50 weight percent of ethylene oxide.

20. A gear oil consisting essentially of
I. about 0.5 to 5% base oil-soluble sulfurized hydrocarbon
II. a base oil-soluble extreme pressure combination selected from the group consisting of
  A. about 3–9% of a mixture of chlorinated hydrocarbon and zinc dithiophosphate, each being present in the gear oil in amounts greater than about 1% and
  B. about 5–15% of a mixture of 1–5%, based on the gear oil, of phospho-sulfurized mineral oil and 4–14%, based on the gear oil, of sulfurized fatty ester
III. about 0.1 to 2% of an oil-soluble ether alcohol consisting essentially of an oxyalkylated fatty alkyl radical-containing material:
  (1) selected from the group consisting of
    A. fatty alcohols and
    B. fatty acid esters of polyhydric alcohols and
  (2) having
    A. 6–32 carbon atoms in the fatty alkyl radical and
    B. up to five $C_2$–$C_4$ alkylene oxide groups per fatty alkyl radical, and
IV. a base mineral oil of lubricating grade.

21. The composition of claim 20 in which the alkylene oxide treated material is polyoxyethylene sorbitol laurate.

22. A gear oil consisting essentially of about 1.5 to 3.5% base oil-soluble sulfurized olefin hydrocarbon, about 2–4% base-oil-soluble chlorinated hydrocarbon, about 2–4% base oil-soluble zinc dialkyl dithiophosphate and about 0.15 to 1.5% of an oil-soluble ether-alcohol consisting essentially of an oxyalkylated fatty alkyl radical-containing material selected from the group consisting of fatty alcohols and fatty acid esters of polyhydric alcohols, said fatty alkyl radical-containing material having 6–32 carbon atoms in the fatty alkyl radical and having up to five $C_2$–$C_4$ alkylene oxide groups per fatty alkyl radical, and a base mineral oil of lubricating grade.

23. The composition of claim 22 where the selected fatty material is sorbitan tristearate.

24. A gear oil consisting essentially of about 0.5 to 3.5% base oil-soluble sulfurized olefin hydrocarbon, about 1–4% base oil-soluble phosphosulfurized mineral oil, about 7–12% sulfurized sperm oil and about 0.15 to 1.5% of an oil-soluble ether-alcohol consisting essentially of an oxyalkylated fatty alkyl radical-containing material selected from the group consisting of fatty alcohols and fatty acid esters of polyhydric alcohols, said fatty alkyl radical-containing material having 6–32 carbon atoms in the fatty alkyl radical and having up to five $C_2$–$C_4$ alkylene oxide groups per fatty alkyl radical, and a base mineral oil of lubricating grade.

25. The composition of claim 24 where the ester is sorbitan tristearate.

References Cited by the Examiner

UNITED STATES PATENTS

| | | | |
|---|---|---|---|
| 2,364,284 | 12/1944 | Freuler | 252—32.7 |
| 2,470,537 | 5/1949 | Waugh | 252—56 |
| 2,628,941 | 2/1953 | Adelson et al. | 252—46.7 |
| 2,696,473 | 12/1954 | Sokol et al. | 252—47.5 |
| 2,715,612 | 8/1955 | Beare | 252—46.6 |
| 2,830,956 | 4/1958 | Wasson et al. | 252—79 |

DANIEL E. WYMAN, *Primary Examiner.*

L. G. XIARHOS, *Assistant Examiner.*